(12) United States Patent
Matthias

(10) Patent No.: US 7,670,714 B2
(45) Date of Patent: Mar. 2, 2010

(54) BATTERY PACK

(75) Inventor: Wolf Matthias, Stutggart (DE)

(73) Assignee: Robert Bosch GmbH, Stuttgart (DE)

( * ) Notice: Subject to any disclaimer, the term of this patent is extended or adjusted under 35 U.S.C. 154(b) by 387 days.

(21) Appl. No.: 11/684,696

(22) Filed: Mar. 12, 2007

(65) Prior Publication Data

US 2007/0238011 A1    Oct. 11, 2007

(30) Foreign Application Priority Data

Apr. 7, 2006    (DE) .................. 10 2006 018 005

(51) Int. Cl.
*H01M 2/02* (2006.01)
(52) U.S. Cl. .................. 429/96; 429/99; 429/100; 429/149; 429/151; 429/159; 173/217
(58) Field of Classification Search .............. 429/149, 429/151, 159, 96, 99, 100
See application file for complete search history.

(56) References Cited

U.S. PATENT DOCUMENTS

| 5,359,492 | A  | * | 10/1994 | Porter ................. 361/679.58 |
| 6,357,533 | B1 |   | 3/2002  | Buchholz et al. |
| 2001/0040036 | A1 |   | 11/2001 | Habedank et al. |
| 2004/0072064 | A1 | * | 4/2004  | Turner et al. ................. 429/97 |

FOREIGN PATENT DOCUMENTS

EP    1 025 961    8/2000

* cited by examiner

*Primary Examiner*—Melvin C Mayes
*Assistant Examiner*—James Corno
(74) *Attorney, Agent, or Firm*—Michael J. Striker

(57) ABSTRACT

A battery pack for an electrical device has a base body, a locking element for locking the base body to the electrical device, and an actuating element for actuating the locking element. The locking element has a retaining region, which is provided for retaining the actuating element at least in the unlocked state of the base body.

12 Claims, 2 Drawing Sheets

BATTERY PACK

CROSS-REFERENCE TO A RELATED APPLICATION

The invention described and claimed hereinbelow is also described in German Patent Application DE 102006018005.4 filed on Apr. 7, 2006. This German Patent Application, whose subject matter is incorporated here by reference, provides the basis for a claim of priority of invention under 35 U.S.C. 119(a)-(d).

BACKGROUND OF THE INVENTION

The invention is based on a battery pack for an electrical device.

A battery pack for a hand power tool is known that can be locked to a handle of the hand power tool by means of a locking means. The battery pack has an actuation button, by which the locking means can be actuated for unlocking the battery pack from a locked position.

SUMMARY OF THE INVENTION

The invention is based on battery pack for an electrical device, having a base body, a locking means for locking the base body to the electrical device, and an actuating means for actuating the locking means.

It is proposed that the locking means has a retaining region, which is provided for retaining the actuating means at least in the unlocked state of the base body. As a result, a structurally simple locking and unlocking mechanism of the battery pack can be achieved. In particular, additional components for retaining the actuating means can be dispensed with, making it possible to reduce the installation space and effort and expense of assembly. The locking means preferably has a detent element, which is provided for producing a detent connection with the electrical device.

Expediently, the locking means has a supporting element for supporting the detent element, and this supporting element forms the retaining region for retaining the actuating means. The supporting element can advantageously be embodied as a spring element. To achieve additional economy in terms of components, the locking means can advantageously be formed by the detent element. The term "spring element" should be understood in particular to mean an element that is intended for the sake of a deformation.

It is furthermore proposed that the locking means be embodied as a spring element. As a result, a robust locking mechanism with strong locking forces can be achieved. The spring element preferably has a detent protrusion for producing a detent connection with the electrical device.

It is also proposed that the spring element is embodied as a metal spring element, as a result of which an especially long-lived locking means can be achieved. In particular, the spring element may be embodied as a bending spring, for instance as a leaf spring.

An especially simple embodiment of the retaining region can be achieved if the locking means has an unlocking direction, and the actuating means is suspended from the retaining region in the unlocking direction. The term "unlocking direction" should be understood to mean in particular a direction in which the locking means is moved out of its locking position for unlocking the base body. In the case of suspension from the retaining region "in a direction", the word "direction" should be understood in particular to mean the direction of a contact force exerted on the retaining region by the actuating means.

In a preferred embodiment of the invention, it is proposed that the retaining region forms a hooklike portion of the locking means. As a result, robust bracing of the actuating means by the locking means can be achieved in a simple way.

Alternatively, the actuating means may have a hooklike portion that is intended to produce a suspended connection with the locking means. The retaining region may be embodied as a recess in the locking means, in which case the hooklike portion engages the recess.

In an advantageous refinement of the invention, it is proposed that the actuating means have an actuation base body, and the retaining region is located inside the actuation base body. As a result, an unintentional release of the retention connection between the locking means and the actuating means can be avoided. The retaining region is advantageously snapped in detent fashion inside the actuation base body.

The actuating means is advantageously pivotably located on the base body, and as a result a structurally simple embodiment of the locking and unlocking mechanism can be achieved.

It is furthermore proposed that the actuating means have a slide face for sliding of the locking means, in which case good guidance of the locking means upon a motion of the locking means relative to the actuating means can be achieved. For example, the locking means is thrust into a slot that is recessed out of the actuating means, and a wall of the slot is embodied as the slide face.

In a preferred embodiment, the actuating means has a pivot shaft for pivoting on the base body and a user operation panel; the retaining region is located between the pivot shaft and the user operation panel. As a result, an especially compact structure can be achieved, and the leverage of the actuating means can advantageously be utilized for moving the locking means.

Advantageously, the base body has a housing with a base side, and the locking means includes a detent protrusion, which as viewed from the base side is located behind the actuating means. As a result, an especially compact embodiment of the locking means, and in particular a short connection distance between the retaining region and the detent protrusion, can be attained. Thus an especially effective transmission of force to the detent protrusion can be attained. The term "base side" of the housing should be understood in this connection to mean in particular one side of the housing that is located diametrically opposite a coupling side; the coupling side, in the locked state of the base body, is coupled to the electrical device, and in particular rests on the electrical device. In particular, the coupling side may have a receiving region for receiving electrical connection means of the electrical device.

The base body moreover advantageously forms a housing with a base side, and the actuating means has a user operation panel which is moved in the direction of the base side for unlocking the base body. Preferably, the entire user operation panel is moved in this direction.

The battery pack is preferably embodied as a sliding battery pack. To that end, the base body expediently has a contact face which represents the entire area of the base body that rests on the electrical device in the locked state of the base body. Preferably, at least a predominant portion of this contact face, and preferably the entire contact face, is embodied as a slide face for sliding on the electrical device when the base body is slid into the locked state. If the base body extends in a longitudinal direction, then this slide face advantageously extends over at least a predominant portion of the length of the base body.

An electrical device, in particular an electric tool with an electrical device base body, such as a handle, is proposed. This handle advantageously has a battery pack that is removable from the electrical device base body and that has a base body, a locking means for locking the base body to the electrical device base body, and an actuating means for actuating the locking means; the locking means has a retaining region, which is intended for retaining the actuating means at least in the unlocked state of the base body. As a result, economies in terms of components and installation space are attainable.

Further advantages will become apparent from the ensuing description of the drawings. In the drawings, one exemplary embodiment of the invention is shown. The drawing, description and claims include numerous characteristics in combination. One skilled in the art will expediently consider the characteristics individually as well and put them together to make useful further combinations.

DESCRIPTION OF THE PREFERRED EMBODIMENT

Figure 1:
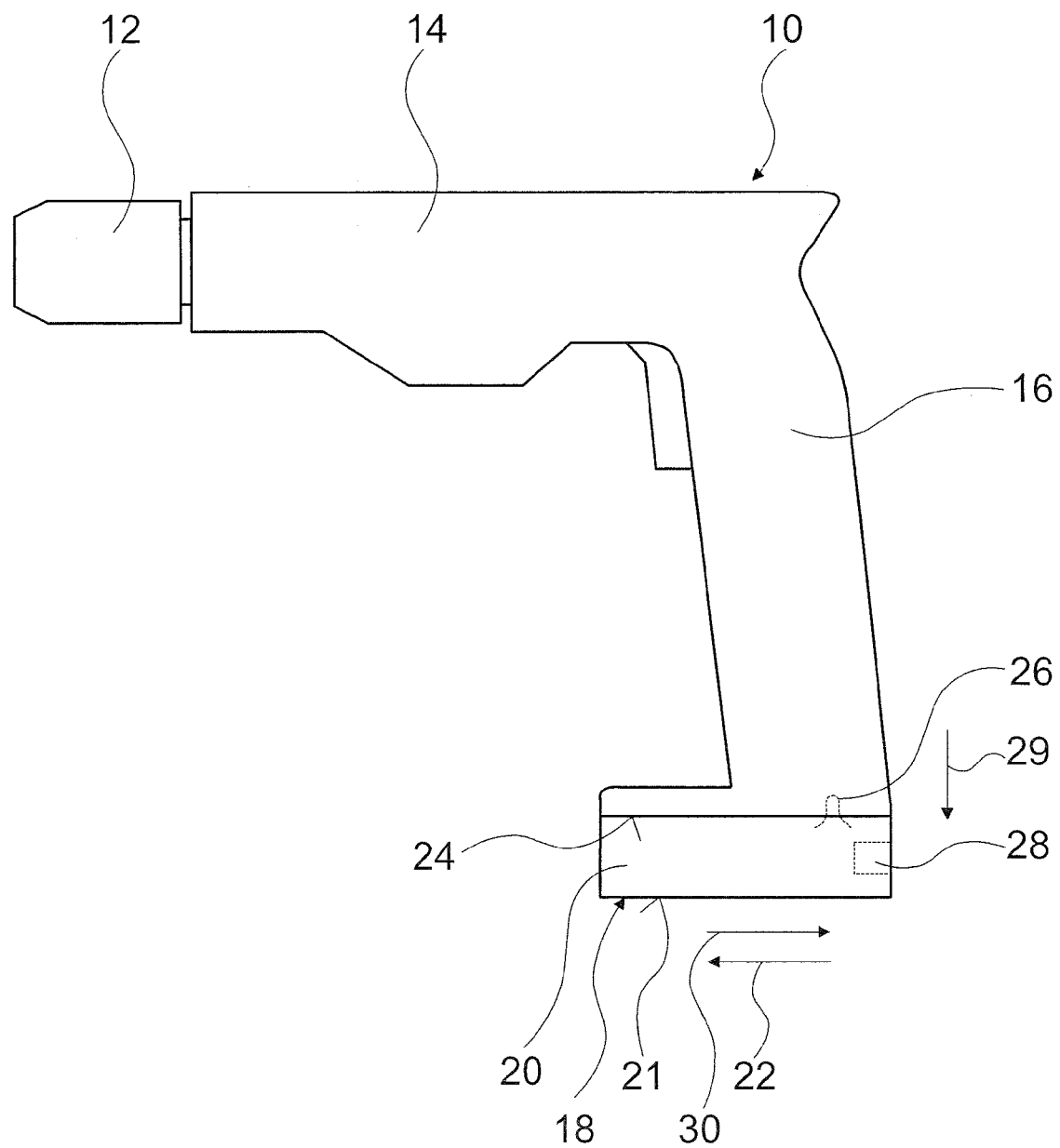
FIG. 1 shows a rechargeable-battery-operated power screwdriver with a handle and with a battery pack locked to the handle.

FIG. 1 shows an electrical device 10 embodied as a hand power tool. The hand power tool is embodied as a rechargeable-battery-operated power screwdriver. It has an electrical device base body 14, to which a tool receptacle 12 is secured. The electrical device base body 14 furthermore forms a handle 16, on which a battery pack 18 is located in locked fashion. The battery pack 18 includes a base body 20, which in particular has a housing of the battery pack 18, the housing having a base side 21. The battery pack 18 is embodied as a sliding battery pack.

For locking the battery pack 18 to the handle 16, the base body 20 is thrust in a sliding direction 22 along the handle 16, specifically along a lower outer face 24 of the handle 16 essentially perpendicular to the longitudinal direction of the handle 16. In the position shown in the drawing, the battery pack 18 is locked on the handle 18 by a locking means 26. In its locking position shown, this locking means is snapped into a detent recess, not shown in detail, of the handle 16. By actuation of an actuating means 28 (shown schematically in FIG. 1), the battery pack 18 can be unlocked from the electrical device 10, as a result of which the locking means 26 is moved in an unlocking direction 29.

After unlocking of the battery pack 18, the base body 20 can be disconnected from the electrical device 10, specifically by sliding the base body 20 in a removal direction 30 along the lower outer face 24 of the handle 16. The sliding direction 22 and the removal direction 30 are oriented substantially transversely to the longitudinal direction of the handle 16. The base body 20, which in particular has the battery pack housing, can furthermore have a component, mounted in this battery pack housing and disconnectable from the battery pack housing, that serves to secure at least one functional component, such as the locking means 26, actuating means 28, and so forth, to the battery pack housing.

Figure 2:
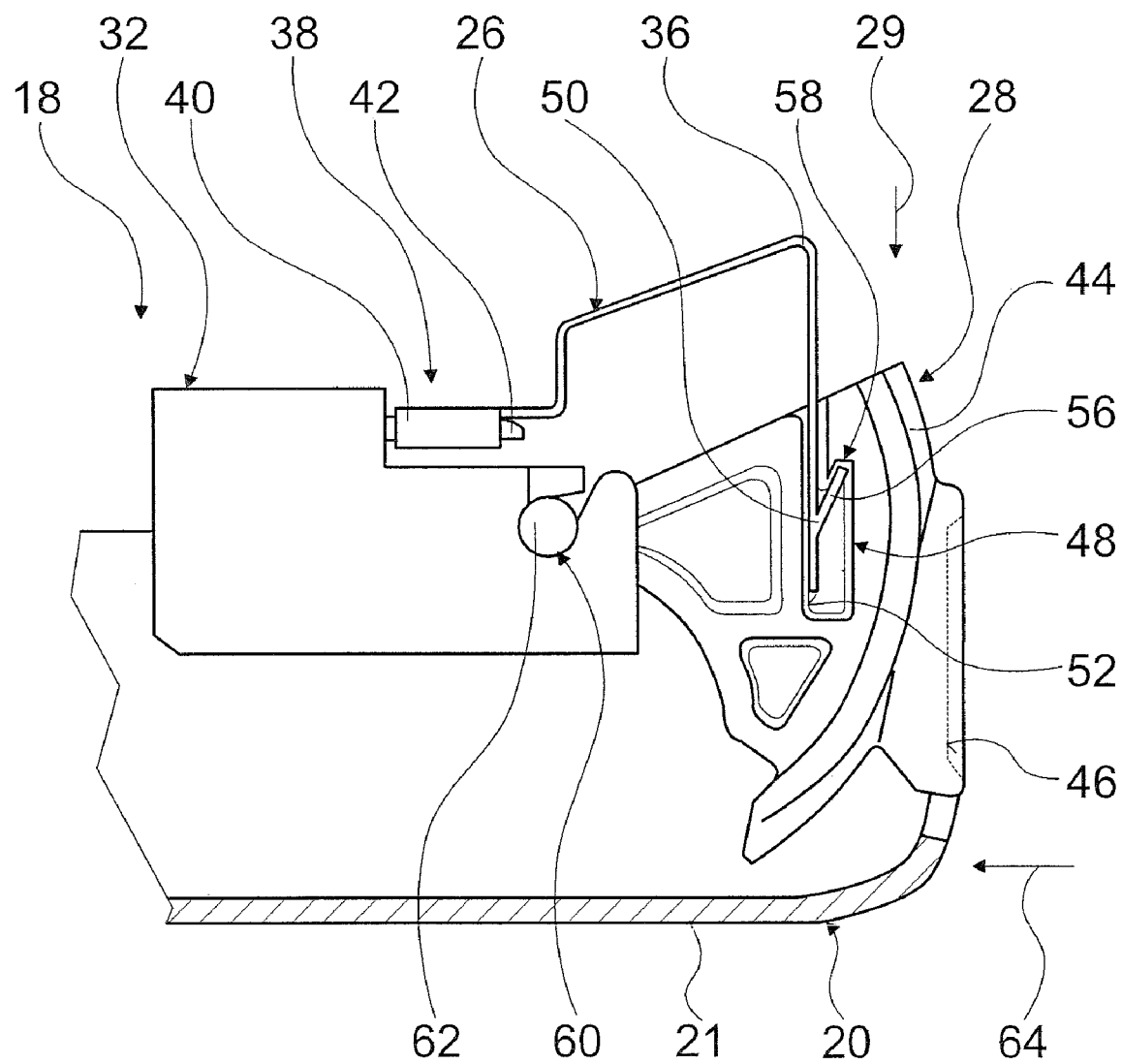
FIG. 2 shows a portion of the battery pack, with a locking means and an actuating means.

In FIG. 2, a portion 32 of the base body 20 of the battery pack 18, along with the locking means 26 and the actuating means 28, are shown in a side view; these elements are located in a mounting shell of the battery pack housing, and this shell forms the base side 21. The portion 32 of the base body 20 may be embodied integrally with the battery pack housing, or it may be a component that is installed in the battery pack housing and can be disconnected from the battery pack housing and that serves to secure the locking means 26 and the actuating means 28 to the battery pack housing.

The locking means 26 is embodied as a metal spring element in the form of a leaf spring. It has a detent protrusion 36, which in the locking position shown in FIG. 1 is snapped into a detent recess in the handle 16. In the locking position in FIG. 1, the spring element is snapped in prestressed fashion into the handle 16. On one end 38, the locking means 26 has an actuating means 40, which grasps a portion 42, embodied as a strut, of the portion 32. Upon installation of the battery pack 18, the actuating means 40 locks around the portion 42, creating a form-locking fastening of the locking means 26 to the base body 20.

The actuating means 28 has an actuation base body 44, which is embodied in the form of a control button. The actuation base body 44 forms a user operation panel 46 for operation of the actuating means 28 by a user. A slot 48, which is engaged by one end 50 of the locking means 26, is also recessed out of the interior of the actuation base body 44. This slot 48 furthermore forms a slide face 52. When pressure is exerted on the detent protrusion 36 in the direction of the base side 21 of the base body 20, specifically in the unlocking direction 29, the detent protrusion 36 is moved in the unlocking direction 29 relative to the actuating means 28. In the process, the end 50 of the locking means 26 slides on the slide face 52 of the actuation base body 44. This pressing is effected for instance by pushing the battery pack 18 into its locked state, whereupon the lower outer face 24 of the handle 16 presses the detent protrusion 36 in the unlocking direction 29, until the detent protrusion 36 snaps into the handle 16.

The actuating means 28 is also connected to the portion 32 of the base body 20. To that end, the portion 32 has a recess 60, embodied as a pivot bearing, in which a pivot shaft 62 of the actuation base body 44 is located. Upon an actuation of the user operation panel 46, and specifically by exertion of a pressure force by the user in an operation direction 64, the actuation base body 44 is pivoted about its pivot shaft 62.

On the end 50 of the locking means 26, a retaining region 56 is shaped in the form of a strut branching off from the end 50. With the end 50, the retaining region 56 forms a hooklike portion of the locking means 26. Upon assembly, the end 50 is introduced into the slot 48, whereupon the retaining region 56 is pressed against the end 50, until it snaps into a detent recess 58 of the actuation base body 44. In the snapped-in state of the retaining region 56 as shown in the drawing, the actuating means 28 is suspended in the unlocking direction 29. As a result, the actuating means 28 is retained in a desired, predefined position relative to the base body 20. The retaining region 56 is furthermore advantageously located in the detent recess 58 in the interior of the actuation base body 44, which prevents unintentional undoing of the suspended connection between the actuating means 28 and the locking means 26. Moreover, in its snapped-in state, the retaining region 56 is located between the pivot shaft 62 and the user operation panel 46.

Upon a pivoting motion of the actuating means 28, pressing the actuation base body 46 against the retaining region 56 causes the locking means 26, and in particular the detent protrusion, to be entrained in the unlocking direction 29.

From the locking position shown in FIG. 1, the base body 20 can as a result be unlocked from the electrical device 10. Upon the motion of the detent protrusion 36, the end 38 remains firmly in its position on the portion 32 of the base body 20, as a result of which a deformation of the locking means 26 and a restoring force are generated.

Beginning at the end 50 of the locking means 26, the locking means 26 extends counter to the unlocking direction 29 as far as the detent protrusion 36, which is thus located behind the actuating means 28, as viewed from the base side 21. If an imaginary line is placed between the pivot shaft 62 and the user operation panel 46, then the projection of the detent protrusion 36 on this line is located along the unlocking direction 29, between the pivot shaft 62 and the user operation panel 46. Beginning at the detent protrusion 36, the locking means 26 extends past the pivot shaft 62 as far as its end 38. In the process, the locking means 26 partly covers the actuating means 28.

It will be understood that each of the elements described above, or two or more together, may also find a useful application in other types of constructions differing from the type described above.

While the invention has been illustrated and described as embodied in a battery pack, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A battery pack for an electrical device, comprising a base body; locking means for locking said base body to the electrical device; actuating means for actuating said locking means, said locking means having a retaining region provided for retaining said actuating means at least in an unlocked state of said base body, wherein said actuating means is pivotally mounted on said base body.

2. A battery pack as defined in claim 1, wherein said locking means is configured as a spring element.

3. A battery pack as defined in claim 1, wherein said locking means is configured as a metal spring element.

4. A battery pack as defined in claim 1, wherein said locking means has an unlocking direction, said actuating means being suspended from said retaining region in said unlocking direction.

5. A battery pack as defined in claim 1, wherein said retaining region forms a hook-shaped portion of said locking means.

6. A battery pack as defined in claim 1, wherein said actuating means has an actuation base body, said retaining region being located inside said actuation base body.

7. A battery pack as defined in claim 1, wherein said actuating means has a slide face for sliding said locking means.

8. A battery pack as defined in claim 1, wherein said base body has a housing with a base side, said locking means including a detent protrusion which as viewed from said base side is located behind said actuatingmeans.

9. A battery pack as defined in claim 1, wherein said actuating means has a user operation panel and a pivot shaft for pivoting relative to said base body, said retaining region being located between said pivot shaft and said operation panel.

10. A battery pack as defined in claim 1, wherein said actuating means is configured such that upon a pivoting motion of said actuating means said locking means are entrained in said unlocked state of said base body.

11. An electrical device, comprising an electrical device base body, and a battery pack including a base body, a locking means for locking said base body to the electrical device, actuating means for actuating said locking means, said locking means having a retaining region provided for retaining said actuating means at least in an unlocked state of said base body, wherein said actuating means is pivotally mounted on said base body.

12. An electrical device as defined in claim 11, wherein said battery pack is removable from said base body.

* * * * *